Sept. 20, 1966 G. K. FARRINGTON ETAL 3,273,897

PHONOGRAPH WITH NOVEL TONE ARM AND PICKUP CARTRIDGE ASSEMBLY

Filed June 13, 1963 2 Sheets-Sheet 1

Inventors:
Gerrald K. Farrington
Harold F. Mosier, Jr.
By: Stone, Mierman, Burmeister & Zummer
Attorneys

PHONOGRAPH WITH NOVEL TONE ARM AND PICKUP CARTRIDGE ASSEMBLY

Filed June 13, 1963 2 Sheets-Sheet 2

Inventors:
Gerrald K. Farrington
Harold F. Mosier, Jr.
By: Stone, Nierman, Burmeister & Zummer
Attorneys United States Patent Office 3,273,897
Patented Sept. 20, 1966

3,273,897

PHONOGRAPH WITH NOVEL TONE ARM AND PICKUP CARTRIDGE ASSEMBLY

Gerrald K. Farrington, Niles, and Harold F. Mosier, Jr., Buchanan, Mich., assignors to Electro-Voice, Incorporated, Buchanan, Mich., a corporation of Indiana Filed June 13, 1963, Ser. No. 287,545
12 Claims. (Cl. 274—24)

The present invention relates to tone arm and pickup assemblies for use in phonographs, and particularly to the structure for mounting a phonograph pickup cartridge on the front end of a tone arm.

Conventional phonographs employ a flat turntable which is mounted on a supporting frame or structure for rotation in a horizontal plane, and a tone arm, also mounted on the supporting frame, extends over the turntable. The tone arm is pivotally mounted on an axis disposed normal to the plane of the turntable, and also pivotally mounted on a second axis which is parallel to the plane of the turntable.

One of the improvements which has been made in recent years on phonographs is to reduce the tracking force between the stylus of the phonograph pickup and the groove of a record disposed upon the turntable. The wear on both the record and the stylus may be reduced by reducing the tracking force. However, as the tracking force is reduced, the susceptibility of the pickup to spurious outputs from jarring increases. It is an object of the present invention to provide a mechanism for mounting the phonograph pickup cartridge on a tone arm which will substantially reduce spurious electrical pulses generated by a phonograph pickup as a result of shocks and vibrations which occur in the vicinity of the phonograph.

Efforts have been made for many years to provide mechanisms to protect both a phonograph record and the stylus and cartridge of a phonograph in the event the tone arm is dropped or forced against a record. Patent No. 2,475,785, entitled "Tone Arm and Pickup Assembly" by C. F. Jensen discloses the combination of a tone arm and phonograph pickup cartridge which is provided with a mechanism for mounting the cartridge on the tone arm which pivots the stylus out of contact with the record if excessive force is applied on the tone arm in the direction of the record. The mounting mechanism of the Jensen patent holds the pickup cartridge firmly on the tone arm until the force exerted on the stylus exceeds a threshold value, and thereafter, the cartridge pivots relative to the tone arm to remove the stylus from the record and place a protecting protuberance in abutment with the surface of the record. It is an object of the present invention to provide a tone arm and phonograph pickup cartridge assembly which employs a means for mounting the cartridge on the tone arm which is effective to reduce spurious electrical responses due to shock or vibration and which responds to excessive pressure on the tone arm directed toward the record to elevate the stylus from the record and place a record protecting member in abutment with the record.

It is also an object of the present invention to provide a combination tone arm and phonograph pickup cartridge which facilitates indexing of a record, that is, locating a particular groove on a record which is to be played without requiring the entire record to be played. With conventional phonograph equipment, it is necessary for the operator to optically align the desired groove on a record with a stylus positioned at a substantial distance above the record, and then to lower this stylus and its associated tone arm to position the stylus in the desired groove. It is an object of the present invention to provide a tone arm and cartridge assembly which permits the tone arm to be disposed in abutment with the record while in a non-playing condition so that the tone arm may be positioned over the desired groove by the operator and then released to assume a playing condition at the selected portion of the record.

Prior to the present invention, the tone arm of a phonograph has been pivoted at its rearward end on a first axis disposed in the vertical plane and a second axis disposed in the horizontal plane. In accordance with the present invention, the phonograph pickup cartridge is pivoted at its rearward end on a third axis parallel to the second pivotal axis of the tone arm, and the cartridge is maintained between two stop positions, the one stop position being remote from the tone arm and the other stop position being adjacent to the tone arm. In the latter position, a pad rather than the stylus, protrudes from the cartridge to abut the surface of the record, and on restoration of the tracking pressure, the cartridge will assume some intermediate position between the stops in which the stylus rather than the pad abuts the record.

For a more complete understanding of the invention and the advantages thereof, reference is made to the drawings, in which.

Figures 3, 4:
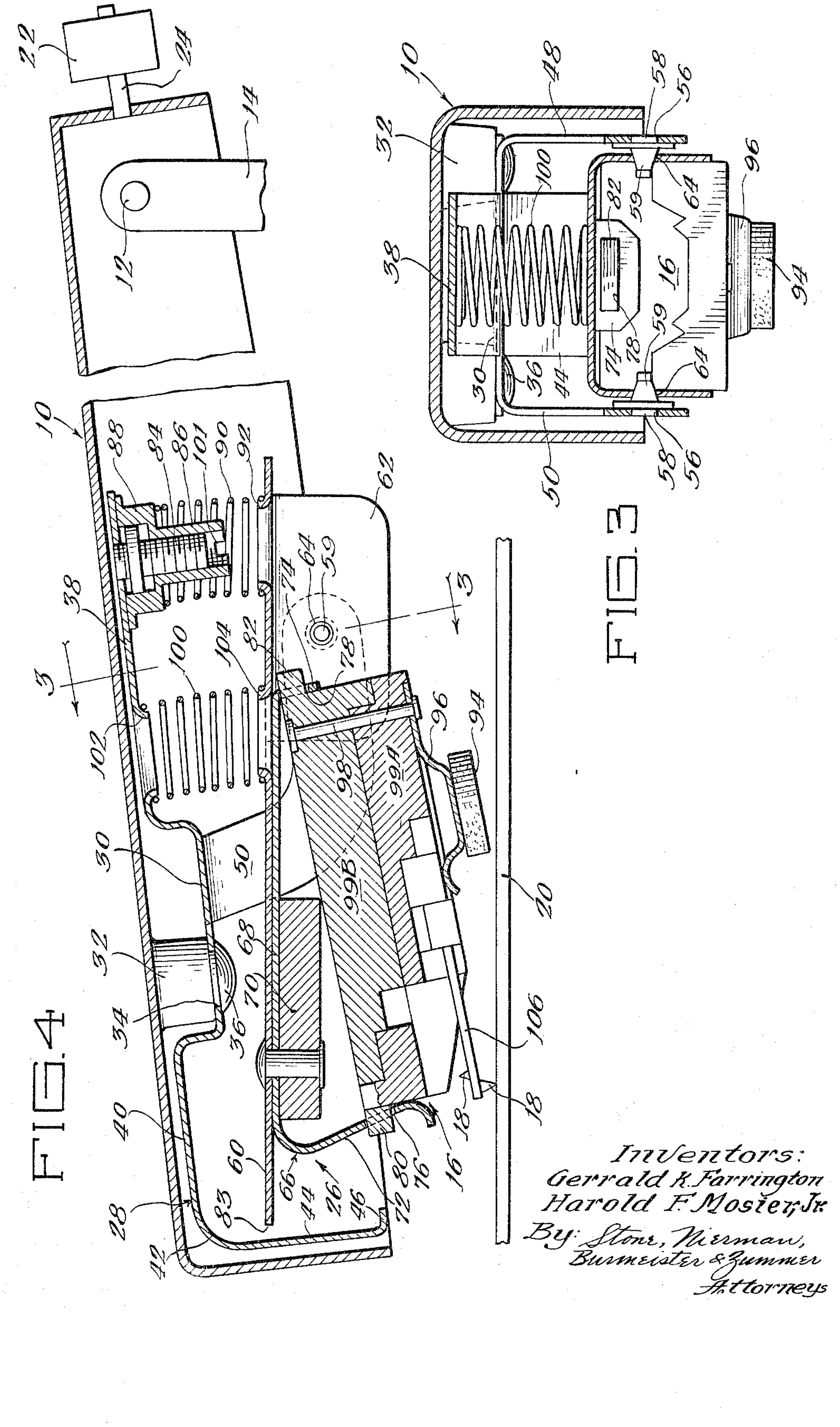
FIGURE 3 is a sectional view taken along the line 3—3 of FIGURE 4.
FIGURE 4 is a sectional view taken along the line 4—4 of FIGURE 2.

FIGURE 4 illustrates a phonograph tone arm 10 mounted at one end on a pin 12 for pivotal motion relative to a vertical spindle 14. The tone arm 10 is free to rotate in a horizontal plane above the axis of the spindle 14, and is free to pivot in a vertical plane about the pin 12. A phonograph pickup cartridge 16 is mounted on the end of the tone arm 10 opposite the pin 12, and a stylus 18 depends from the cartridge 16 and is adapted to engage the groove of a phonograph record illustrated at 20. The phonograph pickup cartridge here disclosed is essentially in mechanical and electrical characteristics that disclosed in Patent No. 3,060,280 to John F. Wood entitled "Electromechanical Transducer" and no further detailed description will be here presented. A counterweight in the form of a threaded nut 22 threadedly engages a threaded shaft 24 which extends from the end of the tone arm 10 adjacent to the pin 12 along the longitudinal axis of the tone arm, and the weight 22 counterbalances the weight of the tone arm 10 and cartridge 16 in order to provide the desired pressure between the stylus 18 and the record 20.

The phonograph pickup cartridge 16 is not directly mounted on the tone arm 10, but it is mounted on a cartridge mounting assembly 26 which is in turn mounted on the tone arm 10. The cartridge mounting assembly 26 has a bracket 28 with an indentation 30 which accommodates a pair of spaced bosses 32 which extend from the confronting surface of the tone arm 10. The indentation 30 has a pair of recesses 34 which extend therein from opposite sides of the bracket 28, and a pair of bolts 36 extend through the recesses 34 and are anchored in the bosses 32.

The bracket 28 has a first flat portion 38 which extends from the indentation 30 therein along the surface of the tone arm 10 toward the rearward end thereof, and a second flat portion 40 extends in the plane of the portion 38 from the indentation 30 toward the front end of the tone arm. The portion 40 terminates in a right angle bend 42 at its end remote from the bosses 32, and a flat portion 44 extends downwardly from the bend 42 to terminate in a lip 46 adjacent to the surface of the record.

A pair of flat arms 48 and 50 extend away from the tone arm 10 from opposite sides of the indentation 30 of the bracket 28, the flat arms 48 and 50 being parallel to each other and disposed in vertical planes. The arms 48 and 50 extend from the indentation 30 along axes close to normal to the plane of the bracket portions 38 and 40, and each of the arms 48 and 50 has a bend 52 approximately centrally thereof which orients the end portions 54 of the arms essentially parallel to the portion 38 of the bracket 28. Each of the arms 48 and 50 is provided with bores 56 adjacent to the end thereof opposite the indentation 30, and a pair of bearings 58 are mounted in the bores 56 confronting each other. Each of the bearings 58 has a conical surface 59 disposed about an axis parallel to the axis of the pin 12 which mounts the tone arm 10.

A mounting plate 60 is disposed adjacent to the portions 38 and 40 of the bracket 28, and has a pair of ears 62 which extend normally therefrom away from the bracket 28. Each of the ears 62 has a circular aperture 64 which engages the conical surface 59 of one of the bearings 58 to pivotally mount the plate 60 on the bracket 28.

The plate 60 carries a second bracket 66 on the side thereof opposite the bracket 28. The second bracket 66 has a flat portion 68 disposed in contact with the plate 60 and which carries a rectangular weight 70 forwardly from the apertures 64 in the plate ears 62. The second bracket 66 also has two legs 72 and 74 which depend from opposite ends of the portion 68, the leg 72 being longer than the leg 74 and disposed adjacent to the front end of the tone arm 10. The leg 72 has an opening 76 therein, and the leg 74 has an opening 78 therein, and the openings 76 and 78 accommodate outwardly extending rectangular flanges 80 and 82 of the cartridge 16 to anchor the cartridge 16 on the plate 60. The end of the plate 60 opposite the bearings 58, designated 83, abuts the lip 46 of the bracket 28 to limit rotation of the plate and retain the plate between the lip 46 of the bracket 28 and the portion 40 of the bracket 28.

A threaded stud 84 extends from the portion 38 of the bracket 28 adjacent to its end, and a cap 86 threadedly engages the stud 84. The cap 86 has a flange 88 extending outwardly therefrom, and a helical spring 90 is mounted on the flange 88 of the cap 86. The end of the spring 90 opposite the cap 86 abuts a circular collar 92 disposed adjacent to the end of the plate 60 remote from the front of the tone arm 10, and the spring 90 exerts pressure between the portion 38 of the bracket 28 and the plate 60. The bearings 58 are disposed between the collar 92 and the stylus 18.

A pad 94 is mounted on the cartridge 16 between the bearings 58 and the stylus 18. This pad 94 is circular in cross section and secured on a sheet metal leaf 96, as by cement, and the leaf 96 is mounted on the cartridge by means of a rivet 98 located at the rear edge of the cartridge 16. In the particular cartridge disclosed, the cartridge has a casing with two mating parts 99A and 99B, and the rivet 98 also secures these parts together as shown in FIGURE 4. The pad 94 is constructed of a material which avoids abrasion of the surface of the record 20, such as cloth, plastic, or some other material. Felt has been found to be the most desirable material for the pad 94.

The pressure of the stylus on the record 20, often called the tracking force, is established by the tone arm 10, and the mechanism utilized for mounting the phonograp pickup cartridge 16 on the tone arm does not affect this stylus pressure. In practice, the pressure of the stylus on the record 20 is adjusted by means of the weight 22 to be a minimum consistent with the excellence and precision of the turntable of the phonograph and any record changer equipment which may be utilized. Current standards of excellence require the stylus pressure to be of the order of 2 or 3 grams for good quality phonograph equipment, although historically such pressures have been of the order of 6 to 10 grams.

Figure 1:
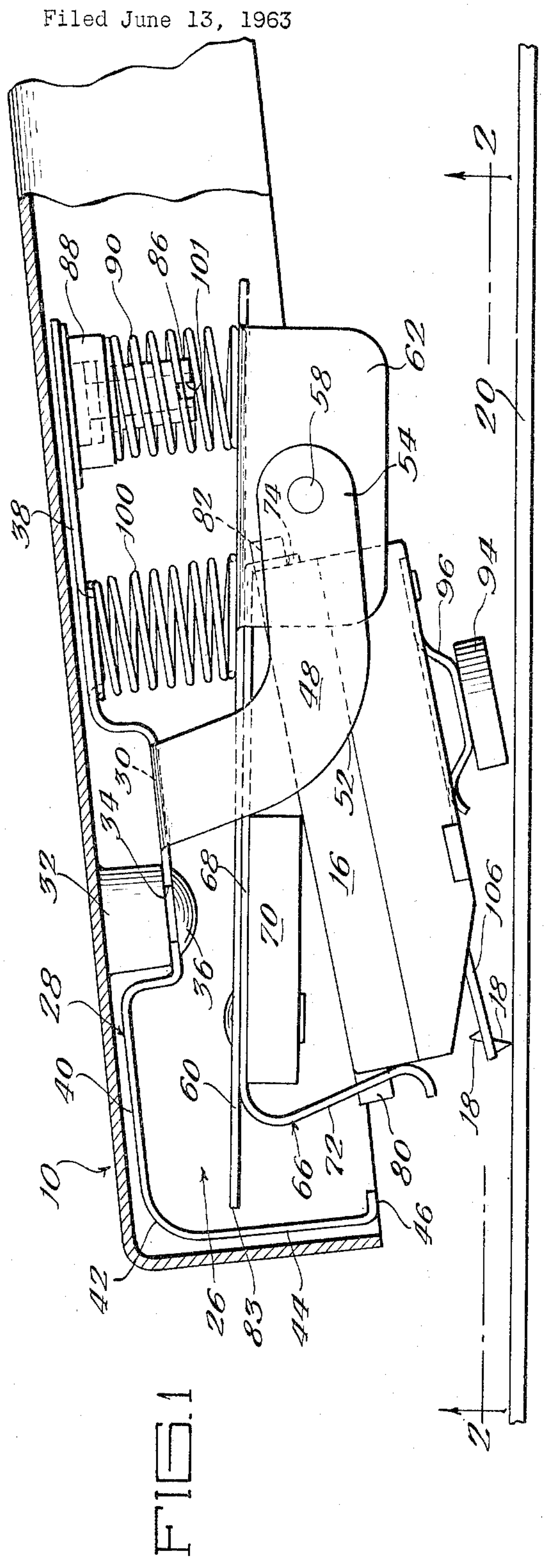
FIGURE 1 is a side elevational view of a tone arm of a phonograph constructed according to the teachings of the present invention, a portion of the tone arm being broken away to show the phonograph pickup cartridge and its mounting mechanism in elevation.
Figure 2:
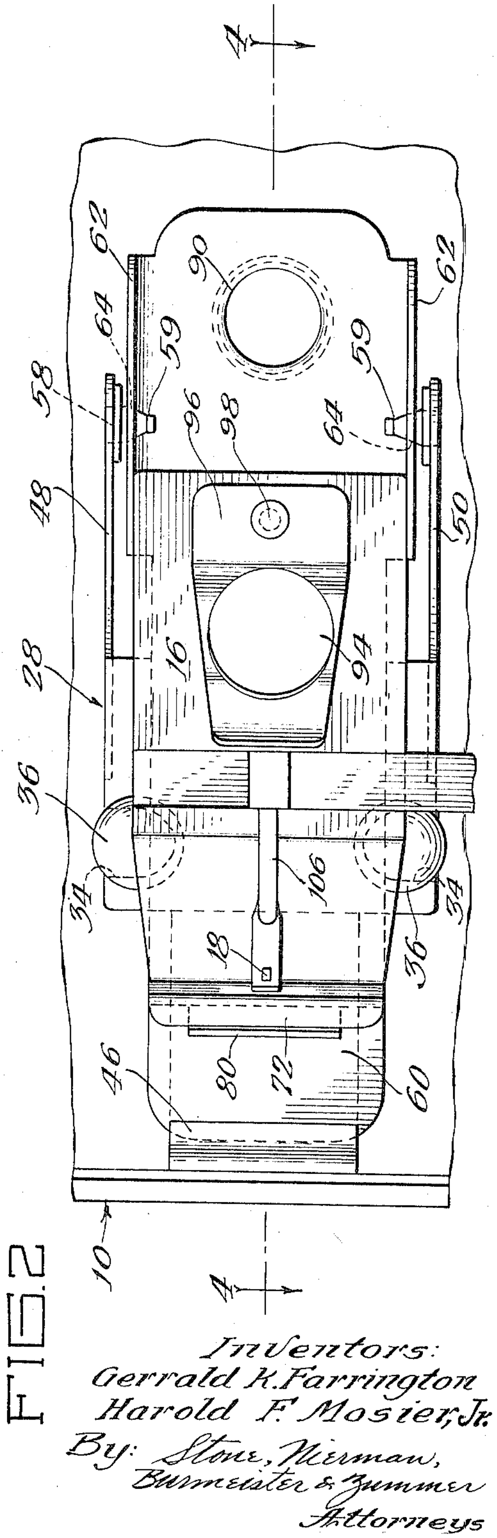
FIGURE 2 is a bottom view of the phonograph pickup cartridge and mounting mechanism taken along the line 2—2 of FIGURE 1.

The weight of the cartridge 16 and the weight 70 create a torque about the pivotal axis formed by the bearings 58 in a counterclockwise direction, as viewed in FIGURES 1 and 4. The tension of the spring 90 acting through the lever arm formed by the portion of the plate 60 between the pivotal axis formed by the bearings 58 and the circular collar 92 opposes the torque of the mass of the cartridge 16 and the weight 70 acting through their effective lever arm. For the plate 60 to assume a position in which the stylus 18 alone abuts the record, as illustrated in FIGURES 1 and 4, clockwise and counterclockwise torques acting about the pivotal axis of the bearings 58 (including the torque of the tracking force on the stylus) must be equal so that the only pressure on the stylus 18 is the pressure exerted by the tone arm 10 acting at the axis of the bearings 58, for example 2 or 3 grams. To achieve this condition, the cap 86 is provided with a screw slot 101 to permit adjustment of the cap 86 to place the necessary compression on the spring 90.

Since in playing condition, the mass of the cartridge 16 and the weight 70 provide a counterclockwise torque equal to the clockwise torque provided by the spring 90 and the pressure of the record acting on the stylus, a further downward force exerted on the tone arm 10 will cause the second bracket 66 and plate 60 to pivot upwardly with the cartridge 16, thereby elevating the stylus 18 from the surface of the record 20 and placing the pad 94 in contact with the surface of the record. If the increased stylus pressure is the result of an upward curvature of the record, the tone arm will reestablish the correct stylus pressure by becoming further elevated, but if the increased stylus pressure is the result of additional force on the tone arm, then the clockwise and counterclockwise forces are unbalanced. The increase in clockwise torque due to increased stylus pressure operates against a fixed counterclockwise torque due to the weight 70 and mass of the cartridge, but the upward rotation of the plate 60 reduces the clockwise torque exerted by the spring 90. Hence there must be a substantial increase in counterclockwise torque to overcome the increased stylus pressure, thus causing the plate 60 to abut the flat portion 40 of the bracket, for example, 5 to 10 grams. Further, the pad 94 is constructed of material which will not mar or abraid the record, such as felt, so that the record is protected when excessive downward force is exerted on the tone arm 10. Also, the stylus is elevated from the record, responsive to such downward force, thus also protecting the stylus 18. When the downward force is removed from the tone arm 10, the clockwise torque about the bearing 58 is less than the counterclockwise torque, since the plate 60 is in a position which reduces the torque contributed by the spring 90. The plate 60 therefore rotates about the axis of the bearings 58 to restore equilibrium, thus forcing the tone arm 10 to rise and cauting the stylus 18 to engage the record.

Some records have a plurality of selections thereon, or contain a particularly desired selection. A tone arm constructed according to the present invention may be utilized to locate a particular selection on a record in a novel manner. It is only necessary to exert force toward the record on the tone arm 10 to elevate the stylus 18 from the record and place the pad 94 in contact with the record, and the tone arm may then be slid across the grooves of the record to align the stylus with the desired groove. It is only necessary to maintain sufficient pressure on the tone arm 10 to elevate the stylus, 5 to 10 grams in the usual application. When the desired groove has been located and is aligned with the stylus 18, removal of the pressure from the tone arm 10 will cause the mass of the cartridge 16 and weight 70 to rotate the cartridge about the pivotal axis formed by the bearings 58 to position the stylus 18 in the desired groove and permit the record to be played in its normal manner. The record continuously rotates at its normal speed during this indexing and selecting process.

The mounting structure for the phonograph pickup cartridge has been designed for use with cartridges of maximum weight as well as minimum weight. The weight 70 is selected for cartridges 16 of maximum weight, and in the event the weight 70 is not sufficient to provide the desired counterclockwise torque about the pivotal axis formed by the bearings 58, a second spiral spring 100 is positioned between a circular collar 102 located in the portion 38 of the bracket 28 adjacent to the indentation 30 and a second circular collar 104 located in the plate 60 between the pivotal axis formed by the bearings 58 and the weight 70. The spring 100 therefore adds stylus pressure in the event the cartridge 16 is of insufficient weight for use in the particular phonograph equipment. In this manner, a very light weight cartridge may be used even though the phonograph requires a relatively large stylus pressure, for example, 6 to 8 grams.

The cartridge 16 illustrated herein is provided with two styli 18 which may be exchanged by rotation of the stylus drive arm, designated 106. The construction of such a phonograph pickup cartridge is fully set forth in Patent No. 3,060,280 referred to heretofore.

The tension exerted by the spring 90 is adjusted by means of the cap 86 to provide a downward force on the stylus 18 which is equal to the tracking pressure provided by the tone arm 10 when the plate 60 is located at an intermediate point between the stops formed by the lip 46 and the portion 40 of the bracket 28. The cartridge 16 may be expected to ride in this position for normal playing of the record 20, and the pad 94 is disposed above and spaced from the record 20. If a shock is transmitted in a downward direction on the tone arm 10, the cartridge 16 will pivot upwardly to permit the decrease in tension of the spring 90 to absorb the shock, and if vibration in a vertical plane is impressed upon the tone arm 10, the cartridge 16 will pivot up and down in accordance with the impressed vibrations.

If it is desired to index or locate a particular groove on the record 20, the operator merely depresses the forward end of the tone arm 10 to translate the plate 60 and the cartridge 16 upwardly into abutment with the portion 40 of the bracket 28 so that the pad 94 becomes the supporting point on the record 20. The pad 94 may be slid across the surface of the record to align the stylus with the desired groove of the record. Since the stylus 18 is spaced from the record by a very small distance, it is not difficult to optically align the stylus with the desired groove. Thereafter, the pressure is removed from the forward end of the tone arm 10, and the weight of the cartridge 16 and weight 70 pivot the cartridge 16 toward the record to cause the stylus 18 to engage the desired groove of the record.

Spiral springs 90 and 100 have been shown in the preferred construction, but it is to be understood, that leaf springs may also be employed. It is, however, necessary that the force applied to the cartridge, or plate 60, be proportional to the deflection of the spring, so that the weight of the cartridge 16, weight 70, and other portions of the carriage to the forward side of the pivotal axis formed by the bearings 58 will be overcome by the added force of the spring 90 when the plate 60 is located somewhere between the stops formed by the lip 46 and the portion 40 of the bracket 28.

Those skilled in the art will devise many modifications and improvements on the phonograph tone arm and pickup cartridge construction set forth in this specification. It is therefore intended that the scope of the present invention be not limited by the foregoing disclosure, but rather only by the appended claims.

The invention claimed is:

1. A phonograph comprising, in combination: a support frame, a flat turntable rotatably mounted on the support frame, an elongated tone arm having forward and rearward ends, means adjacent the rearward end of the tone arm for mounting the tone arm on the support frame for pivotal movement about a first axis parallel to the plane of the turntable, a phonograph cartridge having a record tracking stylus terminating in a tip extending therefrom, a carriage mounted on the tone arm adjacent to the forward end thereof and carrying the cartridge, said carriage being pivotally mounted on the tone arm on a second pivotal axis parallel to the first pivotal axis, the cartridge being secured on the carriage between said second axis and the forward end of the tone arm with the stylus extending away from the tone arm in a plane normal to the first and second pivotal axes, a pad mechanically coupled to the carriage and disposed between the stylus and the second pivotal axis, said pad extending to the side of the plane passing through the second pivotal axis and the tip of the stylus remote from the tone arm, stop means mounted on the tone arm for limiting pivotal movement of the carriage about the second axis between a first position in which the stylus depends farther from the tone arm than the pad and is adapted to abut the turntable and a second position in which the pad depends farther from the tone arm than the stylus and is adapted to abut the turntable, means operatively associated with the tone arm for maintaining a first torque about the first axis in a direction and magnitude to force the tone arm into abutment with the turntable at a record tracking force, and means including a spring operatively associated with the carriage for establishing a second torque about the second axis in the same direction as the first torque about the first axis, the force component of said second torque at the stylus being less than the force component of the first torque at the stylus when the carriage is disposed in the first position of the stop means, and the force component of the second torque at the stylus being more than the force component of the first torque at the stylus when the carriage is disposed in the second position of the stop means, and the force component of said second torque at the stylus varying between said values for positions of the carriage between said first and second positions, the carriage being disposed in a position between the first and second positions in which the force component of the second torque at the stylus is approximately equal to the force component of the first torque at the stylus during normal reproducing conditions with the stylus on the record.

2. A phonograph comprising the combination of claim 1 wherein the carriage has a plate with a portion disposed on the side of the second axis opposite the cartridge, and the spring of the means for establishing a second torque extends between the tone arm and said portion of the plate, said spring urging said portion of the plate away from the tone arm.

3. A phonograph comprising, in combination, a support frame, a flat turntable rotatably mounted on the support frame, an elongated tone arm having a forward end and a rearward end, means adjacent the rearward end of the tone arm for mounting the tone arm on the support frame for pivotal movement about a first pivotal axis parallel to the plane of the turntable, a phonograph cartridge having a record tracking stylus terminating in a tip extending therefrom, a bracket mounted on the tone arm having an elongated strip disposed generally parallel to the tone arm and an end portion adjacent to the forward end of the tone arm extending from the bracket generally normal to and forward the plane on the turntable, a pair of spaced generally parallel arms extending from the bracket strip each arm having a protruding conical pin extending toward the other arm, the pins being disposed on a second axis parallel to the first pivotal axis of the tone arm and disposed between the tone arm and the turntable surface, a flat elongated plate having a pair of generally parallel ears extending normally therefrom at one end thereof, each of said ears having a circular bore therein and the bores being disposed on an axis parallel to the plane of the plate and normal to the axis of elongation of the plate, said bores engaging the pins of the arms and journaling the plate between the pins of the arms, a cartridge holder mounted on the surface of the plate opposite the tone arm, a cartridge mounted on the cartridge holder between the pins and the end portion of the bracket with the stylus extending away from the tone arm in a plane normal to the first pivotal axes of the tone arm, a pad mounted on the cartridge between the stylus and the pins and extending to the side of the plane passing through the second pivotal axis and the tip of the stylus remote from the tone arm, a lip extending toward the rearward end of the tone arm from the end of the end portion of the bracket for engaging the end of the plate and limiting pivotal movement of the carriage about the pins between a first position in which the stylus depends farther from the tone arm than the pad and is adapted to abut the turntable and a second position in which the pad depends farther from the tone arm than the stylus and is adapted to abut the turntable, means operatively associated with the tone arm for maintaining a first torque about the pivotal axis of the tone arm in a direction and magnitude to force the tone arm into abutment with the turntable at a record tracking force, the mass of the cartridge and portion of the carriage between the second pivotal axis and the forward end of the tone arm exceeding the mass of the portion of the carriage on the opposite side of said second pivotal axis to exert a first torque component about the second pivotal axis in the same direction as the first torque and in excess of the first torque, and means including a spring extending between the tone arm and the portion of the carriage between the second pivotal axis and the rearward end of the tone arm exerting a second torque component about the second pivotal axis opposing the first torque component about the second pivotal axis due to the mass of the cartridge, said first and second torque components portion of the carriage between the second pivotal axis and the forward end of the tone arm and establishing a second torque about the second pivotal axis in the same direction as the first torque about the first pivotal axis, the force component of said second torque at the stylus being less than the force component of the first torque at the stylus when the carriage is disposed in the first position of the stop means, and the force component of the second torque at the stylus being more than the force component of the first torque at the stylus when the carriage is disposed in the second position of the stop means, and the force component of said second torque at the stylus varying between said values for positions of the carriage between said first and second positions, the carriage being disposed in a position between the first and second positions in which the force component of the second torque at the stylus is approximately equal to the force component of the first torque at the stylus during normal reproducing conditions with the stylus on the record.

4. A phonograph tone arm and cartridge assembly comprising, in combination, an elongated tone arm having forward and rearward ends, means adjacent the rearward end of the tone arm for mounting the tone arm on a support for pivotal movement about a horizontal axis, a phonograph cartridge having a record tracking stylus terminating in a tip extending therefrom, a carriage mounted on the tone arm adjacent to the forward end thereof and carrying the cartridge, said carriage being pivotally mounted on the tone arm on a second pivotal axis parallel to the first pivotal axis, the cartridge being secured on the carriage between said second pivotal axis and the forward end of the tone arm with the stylus extending away from the tone arm in a plane normal to the first and second pivotal axis, a pad mechanically coupled to the carriage and disposed between the stylus and the second pivotal axis, said pad extending to the side of the plane passing through the second pivotal axis and the tip of the stylus remote from the tone arm, means mounted on the tone arm for limiting pivotal movement of the carriage about the second axis between two positions, the first of said positions positioning the end of the carriage remote from the second pivotal axis adjacent to the tone arm and exposing the pad below the stylus, and the second of said positions positioning the carriage remote from the tone arm and exposing the stylus below the pad, means operatively associated with the tone arm for maintaining a first torque about the first pivotal axis in a direction and magnitude to force the tone arm into abutment with a turntable at a record tracking force, and means including a spring mounted between the tone arm and the carriage for establishing a second torque about the second pivotal axis in the same direction as the torque about the first pivotal axis, the torque about the second pivotal axis having a force component at the stylus more than the force component of the first torque about the first pivotal axis when the carriage is disposed in the first stop position and a force component at the stylus less than the force component of the first torque about the first pivotal axis when the carriage is in the second stop position, the force component at the stylus of the second torque varying between said values for positions of the carriage between said first and second positions, the carriage being disposed in a position between said first and second positions in which said force component at the stylus of the second torque is approximately equal to the force component at the stylus of the first torque during normal reproducing conditions with the stylus on the record.

5. A phonograph pickup and tone arm assembly comprising the elements of claim 4 in combination with means for adjusting the tension of the spring.

6. A combination tone arm and pickup cartridge assembly comprising the elements of claim 4 wherein the pad is constructed of felt.

7. A combination pickup and tone arm assembly comprising the elements of claim 4 in combination with a second spring disposed between the tone arm and carriage, said second spring abutting the carriage between the second pivotal axis and the forward end of the tone arm to increase the second torque about the second pivotal axis.

8. A combination tone arm and pickup cartridge assembly comprising the elements of claim 4 in combination with a weight mounted on the carriage between the second pivotal axis and the forward end of the tone arm to increase the second torque about the second pivotal axis.

9. A phonograph tone arm and cartridge assembly comprising the combination of claim 4 wherein the spring included in the means for establishing the second torque decreases the second torque, and the mass of the carriage and phonograph cartridge exert a torque component about the second axis greater than the torque component of the spring and in the opposite direction from the torque component of the spring.

10. An assembly adapted to be mounted on the tone arm of a phonograph for reproducing grooved records comprising a carriage and a pickup cartridge mounted on the carriage having a stylus adapted to follow a record groove extending from the cartridge, said carriage including a bracket adapted to be mounted in a fixed position on the phonograph tone arm, an elongated plate mounted on the bracket for pivotal movement relative to the bracket about an axis disposed in a plane parallel to the plane of the record groove when the tone arm is in playing position, the axis of elongation of the plate being disposed normal to the pivotal axis, the cartridge being mounted on the side of the plate adapted to confront the record and on one side of the pivotal axis with the stylus disposed in a plane normal to the pivotal axis and depending from the cartridge for engaging a record, stop means operatively associated with the carriage and the bracket for limiting pivotal movement of the plate between two limits, the second limit positioning the cartridge closer to the carriage than the first limit, means operative between the bracket and the plate for establishing a torque about the pivotal axis in a direction toward the first limit, said torque exerting a force component on the stylus varying from a value less than the tracking force of the cartridge when the plate is disposed in the position of the first limit to a value greater than the tracking force of the cartridge when the plate is disposed in the position of the second limit, a pad mounted on the cartridge between the stylus and the pivotal axis and extending to the side of a plane passing through the pivotal axis and the tip of the stylus opposite from the plate, said pad being adapted to engage the surface of a record when the plate of the carriage is disposed in the position of the second limit and the stylus being adapted to engage the surface of the record when the plate is disposed in the position of the first limit, said stylus also being adapted to engage the surface of the record when the plate is disposed between the first and second limits and the torque exerted on the plate exerts a force component on the stylus approximately equal to the tracking force of the cartridge.

11. A phonograph pickup cartridge and carriage assembly comprising the combination of claim 10, wherein the torque established on the plate has a first component in a direction toward the first limit which is substantially a constant for all rotational positions of the plate, and a second component in the opposite direction which increases for rotational positions of the plate closer to the first stop limit.

12. A phonograph pickup cartridge and carriage assembly comprising the combination of claim 11, wherein the first component of the torque on the plate results from the mass of the cartridge and the portion of the plate on the same side of the pivotal axis as the cartridge, and the second torque component results from a spring extending between the bracket and the plate.

References Cited by the Examiner

UNITED STATES PATENTS

| | | | |
|---|---|---|---|
| 2,475,785 | 7/1949 | Jensen | 274—24 |
| 2,572,712 | 10/1951 | Fisher | 274—24 |
| 3,173,692 | 3/1965 | Van Antwerp | 274—23 |

NORTON ANSHER, *Primary Examiner.*

C. B. PRICE, *Assistant Examiner.*

UNITED STATES PATENT OFFICE

CERTIFICATE OF CORRECTION

Patent No. 3,273,897 September 20, 1966

Gerrald K. Farrington et al.

It is hereby certified that error appears in the above numbered patent requiring correction and that the said Letters Patent should read as corrected below.

Column 6, line 71, for "forward" read -- toward --.

Signed and sealed this 14th day of January 1969.

(SEAL)
Attest:

Edward M. Fletcher, Jr.
Attesting Officer

EDWARD J. BRENNER
Commissioner of Patents